(12) United States Patent
Watarai

(10) Patent No.: US 8,049,788 B2
(45) Date of Patent: Nov. 1, 2011

(54) COLOR DIFFERENCE CORRECTION AND IMAGING DEVICE

(75) Inventor: Yuji Watarai, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 444 days.

(21) Appl. No.: 12/368,654

(22) Filed: Feb. 10, 2009

(65) Prior Publication Data

US 2009/0207268 A1 Aug. 20, 2009

(30) Foreign Application Priority Data

Feb. 15, 2008 (JP) ................................. 2008-034751

(51) Int. Cl.
*H04N 5/228* (2006.01)
(52) U.S. Cl. ............... 348/222.1; 348/223.1; 348/256; 348/557; 348/650; 382/167; 358/518
(58) Field of Classification Search .............. 348/222.1, 348/29, 223.1, 256, 557, 650; 382/167; 358/518
See application file for complete search history.

(56) References Cited

U.S. PATENT DOCUMENTS

| | | | |
|---|---|---|---|
| 5,721,628 A | 2/1998 | Takaragi et al. | |
| 7,831,092 B2 * | 11/2010 | Sakaguchi et al. | 382/167 |
| 2003/0174222 A1 * | 9/2003 | Uchida | 348/241 |
| 2006/0120598 A1 * | 6/2006 | Takahashi et al. | 382/167 |
| 2009/0304274 A1 * | 12/2009 | Yoshii et al. | 382/167 |

FOREIGN PATENT DOCUMENTS

| JP | 02-249365 A | 10/1990 |
|---|---|---|
| JP | 2006-332732 A | 12/2006 |

* cited by examiner

*Primary Examiner* — Jason Chan
*Assistant Examiner* — Cynthia Calderon
(74) *Attorney, Agent, or Firm* — Arent Fox LLP

(57) ABSTRACT

An image signal processing device for correcting color difference signals includes a first correcting unit configured to set a correction amount for input color difference signals to "0" and generating output color difference signals when a colorless area containing the original point of a color difference space in which the two color difference signals are set as two intersecting axes, a first boundary line through which the inside and outside of the colorless area are partitioned, a suppression area which is nearer to the original point than the first boundary line and defined by a color difference suppression width, and a second boundary line through which the interior of suppression area and the inside area of the suppression area are partitioned are set in the color difference space and the values of the color difference signals are at the outside of the colorless area.

15 Claims, 8 Drawing Sheets

COLOR DIFFERENCE CORRECTION AND IMAGING DEVICE

CROSS-REFERENCE TO RELATED APPLICATIONS

This application is based upon and claims the benefit of priority of the prior Japanese Patent Application No. 2008-034751, filed on Feb. 15, 2008 the entire contents of which are incorporated herein by reference.

FIELD

The embodiments discussed herein are directed to an image signal processing device, an image signal processing method and an imaging device.

BACKGROUND

An imaging device, such as a digital camera, converts an image signal output from an imaging element, such as CCD type, CMOS type, to a brightness signal (Y) and a color difference signal (Cb, Cr), and records the converted image signal into an external recording medium, such as a memory card.

The image signal contains a lot of noise when the amount of light incident to one pixel is reduced due to high pixelation of an imaging element or when sensitized imaging is executed by night, for example. One method of reducing the noise is to utilize various spatial filters using the value of a noted pixel and the values of peripheral pixels around the noted pixel (for example, see JP-A-2-249365). A low pass filter for removing high frequency components, a median filter adopting a median value, etc. are known as the spatial filters. These spatial filters are particularly effective for noise from high frequency components of brightness components.

Another method of reducing the noise is to determine the color saturation of an image from the color difference signal (Cb, Cr) and make the color difference signal (Cb, Cr) variable with respect to an image having low brightness and color saturation on the basis of the brightness signal (Y) and the color saturation (for example, see JP-A-2006-332732). This method is more effective to color shift noise in which colors different from the original color are speckled, as compared with the spatial filter. This is because it is estimated that noise based on the color shift contains more low frequency components than noise based on the brightness component, and thus it is distributed in a broad range.

However, in connection with the high pixelation of the imaging element requirement and the highly sensitized imaging requirement, observation of the noise based on the color shift is not limited to the dark portion, but expands over the whole area of the brightness level. However, according to this method, the color difference signal is made variable with respect to an image having high brightness and saturation for adaptation, and thus the value of the color difference signal is varied as a whole, so that a color indicated by a signal to be stored is displaced from the color of a subject, that is, color shift occurs over the whole area of the color difference level. Accordingly, in the case of the above method, it is difficult to reduce the color shift noise.

Furthermore, the image signal having the large amount of noise described above also has a large amount of noise in the brightness signal. Therefore, the above method may induce new color shift noise correlated to the brightness noise because its processing is dependent on the brightness.

SUMMARY

According to one aspect of the invention, an image signal processing device for correcting color difference signals, including a first correcting unit configured to set a correction amount for input color difference signals to "0" and generating output color difference signals when a colorless area containing the original point of a color difference space in which the two color difference signals are set as two intersecting axes, a first boundary line through which the inside and outside of the colorless area are partitioned, a suppression area which is nearer to the original point than the first boundary line and defined by a color difference suppression width, and a second boundary line through which the interior of suppression area and the inside area of the suppression area are partitioned are set in the color difference space and the values of the color difference signals are at the outside of the colorless area, a second correcting unit configured to correct the input color difference signals so that the values of the input color difference signals approach to "0" when the values of the color difference signals are inside of the suppression area, thereby generating the output color difference signals, and a third correcting unit configured to correct the input color difference signals so that the value of each of the input color difference signals is located between a value on the first boundary line and a value on the second boundary line when the values of the color difference signals are within the colorless area and outside the suppression area, thereby generating the output color difference signals.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DETAILED DESCRIPTION OF THE EMBODIMENTS

Aspects in accordance with an embodiment of an imaging device will be described with reference to the drawings.

Figure 1:
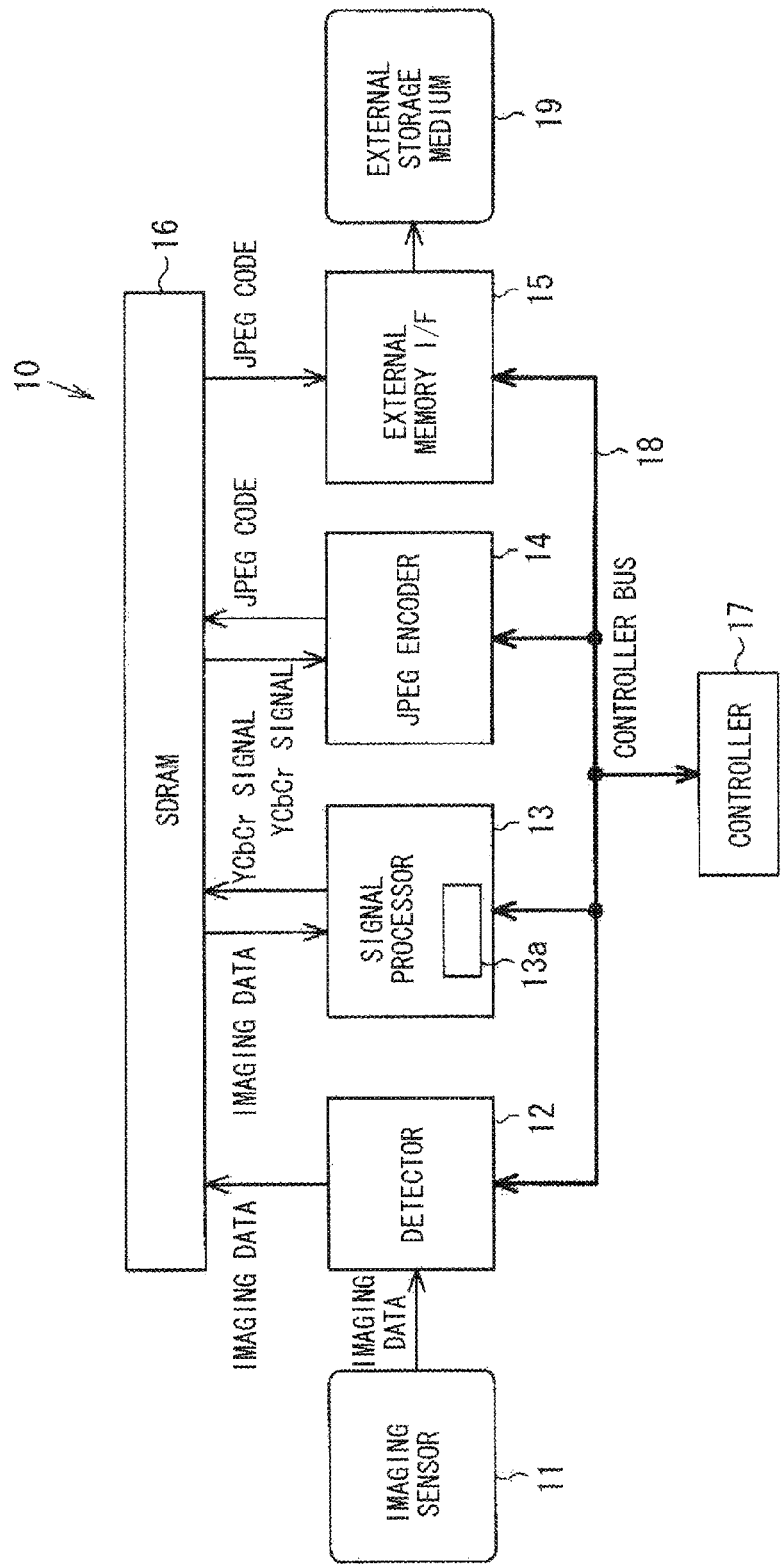
FIG. 1 illustrates a block circuit diagram showing the system construction of a digital camera.

As shown in FIG. 1, the digital camera 10 has an imaging sensor 11, a detector 12, a signal processor 13 as a signal converter, a JPEG (Joint Photographic Experts Group) encoder 14 as a code converter, an external memory interface 15, SDRAM (Synchronous DRAM) 16 as a system memory, and a controller 17. The detector 12, the signal processor 13, the JPEG encoder 14, the external memory interface 15 and the controller 17 are mutually connected to one another through a control bus 18. For example, the detector 12, the signal processor 13, the JPEG encoder 14, the external memory interface 15 and the controller 17 are formed on one chip, and constitute an image signal processing device. The digital camera 10 is constructed so that an external recording medium 19 as a card type recording device is attachable to and detachable from the digital camera 10, and the external recording medium 19 inserted in the digital camera 10 is connected to the external memory interface 15.

The imaging sensor 11 is a CCD image sensor or a CMOS image sensor, for example, and has plural pixels. The imaging sensor 11 converts light incident through an optical lens, etc. from the subject is converted to an electrical signal at these pixels, converts the electrical signal to a digital signal through an A/D converter (not shown) to obtain imaging data, and then stores the imaging data through the detector 12 into SDRAM 16.

The imaging sensor 11 forms/outputs imaging data of the whole image while electrical signals of a series of pixels on a line in the horizontal direction are successively transmitted in the vertical direction and electrical signals of a series of pixels transmitted to the end portion in the vertical direction are successively transmitted in the horizontal direction. The imaging sensor 11 has a color filter (not shown) in which filters of red (R), green (G) and blue (B) are arranged in a Bayer pattern. The imaging sensor 11 outputs imaging data corresponding to the arrangement of the color filter, that is, the imaging data of the Bayer-pattern arrangement. The detector 12 obtains an estimation value from the whole image through the imaging data and also stores the imaging data into SDRAM 16.

The signal processor 13 receives the imaging data stored in SDRAM 16, interpolates the imaging data of the Bayer-pattern arrangement by a well-known method, and converts the interpolated imaging data to a YCbCr signal comprising a brightness signal Y and two color-difference signals Cb, Cr by a well-known method. Cb represents the difference signal of blue, and Cr represents the difference signal of red.

The signal processor 13 has a correcting processor 13a as a signal corrector. The correcting processor 13a executes predetermined correction processing on the converted color difference signals Cb, Cr according to set image processing parameters to generate corrected color difference signals Cb', Cr'. The signal processor 13 may subject the YCbCr signal simultaneously with the signal conversion, just after the conversion or after the correction to various kinds of processing such as other noise reduction (processing using a spatial filter for removing high-frequency components, for example), filter processing such as edge enhancement, color conversion or the like, image resolution conversion, etc. The signal processor 13 stores the processed YCbCr signal (the brightness signal Y and the corrected color difference signal Cb', Cr') into SDRAM 16.

The signal processor 13 subjects the converted color difference signals Cb, Cr to noise suppressing processing for suppressing color shift noise according to the set image processing parameters. The signal processor 13 may subject the YCbCr signal, simultaneously with the signal conversion or after the conversion, to various kinds of processing such as other noise reduction, filter processing such as edge enhancement, color conversion, image resolution conversion, etc.

The JPEG encoder 14 receives the YCbCr signal stored in SDRAM 16, converts the YCbCr signal as compression code to JPEG code and then stores it into SDRAM 16. The external memory interface 15 stores the JPEG code input from SDRAM 16 into the external recording medium 19.

The controller 17 controls the operation, etc. of the detector 12, the signal processor 13, the JPEG encoder 14 and the external memory interface 15. For example, the controller 17 sets the image processing parameters in the signal processor 13. The controller 17 sets as the image processing parameters values of various kinds of set items which are selected according to a key operation (not shown) provided to the digital camera 10.

Next, the correction processing in the correcting processor 13a will be described in detail.

In the correcting processor 13a, a colorless area is defined in a predetermined range around a point at which the values of the color difference signals are equal to "0", that is, a point (a colorless point) which corresponds to the center point of a color difference space in which the color difference signals Cb and Cr are represented. The correcting processor 13a determines whether the values of the color difference signals Cb, Cr are contained in the colorless area. The correcting processor 13a generates suppressed color difference signals whose values are equal to the color difference values of the color difference signals Cb and Cr when the values of the color difference signals Cb and Cr contained in the colorless area are made to approach to "0", and also generates suppressed color difference signals which are equal to the color difference values of the color difference signals Cb, Cr which are not contained in the colorless area.

Furthermore, a suppression area for suppressing the above correction is defined in the colorless area in the correcting processor 13a. The suppression area is set to a predetermined color difference suppression width along a colorless area boundary as a frame for defining the colorless area. The correcting processor 13a generates suppressed color difference signals whose color difference values of the color difference signals Cb, Cr are made to approach to "0" as described above, in the case where the values of the color difference signals Cb, Cr are within the suppression area.

When the value of the color difference signal Cb, Cr is within the suppression area, the correcting processor 13a suppresses the above correction in accordance with the value concerned.

The value defining the above colorless area is set as a first reference value, and a value which is smaller than the first reference value and set by the color difference suppression width is set as a second reference value. The correcting processor 13a generates a suppress color difference signal whose value is equal to the value of the color difference signal Cb, Cr when the value of the color difference signal Cb, Cr is larger than the first reference value. Furthermore, the correcting processor 13a generates suppressed color difference signals whose values are equal to the values of the color difference signals Cb, Cr when the values of the color difference signals Cb, Cr are made to approach to "0" which is "colorless," when the value of the color difference signal Cb, Cr is smaller than the second reference value. Furthermore, when the value of the color difference signal Cb, Cr is located between the second reference value and the first reference value, the correcting processor 13a generates suppressed color difference signals whose values are set to values between the output value corresponding to the first reference value and the output value corresponding to the second reference value.

That is, the correcting processor 13a functions as a first correcting unit for correcting the color difference signal Cb, Cr whose value is above the first reference value, a second correcting unit for correcting the color difference signal Cb, Cr whose value is below the second reference value, and a third correcting unit for correcting the color difference signal Cb, Cr whose value is between the first reference value and the second reference value. The first correcting unit corrects the value of the color difference signal Cb, Cr above the first reference value to the equal value. That is, the suppressed color difference signal whose value is equal to the value of the color difference signal Cb, Cr above the first reference value is generated. The second correcting unit corrects the value of the color difference signal Cb, Cr below the second reference value to a value near to "0". The third correcting unit corrects the value of the color difference signal Cb, Cr to a value between the output value corresponding to the first reference value and the output value corresponding to the second reference value.

As an example, the correcting processor 13a functioning as the second correcting unit corrects the value of the color difference signal Cb, Cr below the second reference value to "0". That is, the correcting processor 13a outputs the suppressed color difference signal whose value is equal to "0". Furthermore, the correcting processor 13a functioning as the third correcting unit outputs the suppressed color difference signal having the value of the color difference signal Cb, Cr when the value of the color difference signal Cb, Cr is corrected to a value on a line connecting the output value corresponding to the first reference value and the output value (=0) corresponding to the second reference value.

Figure 5:
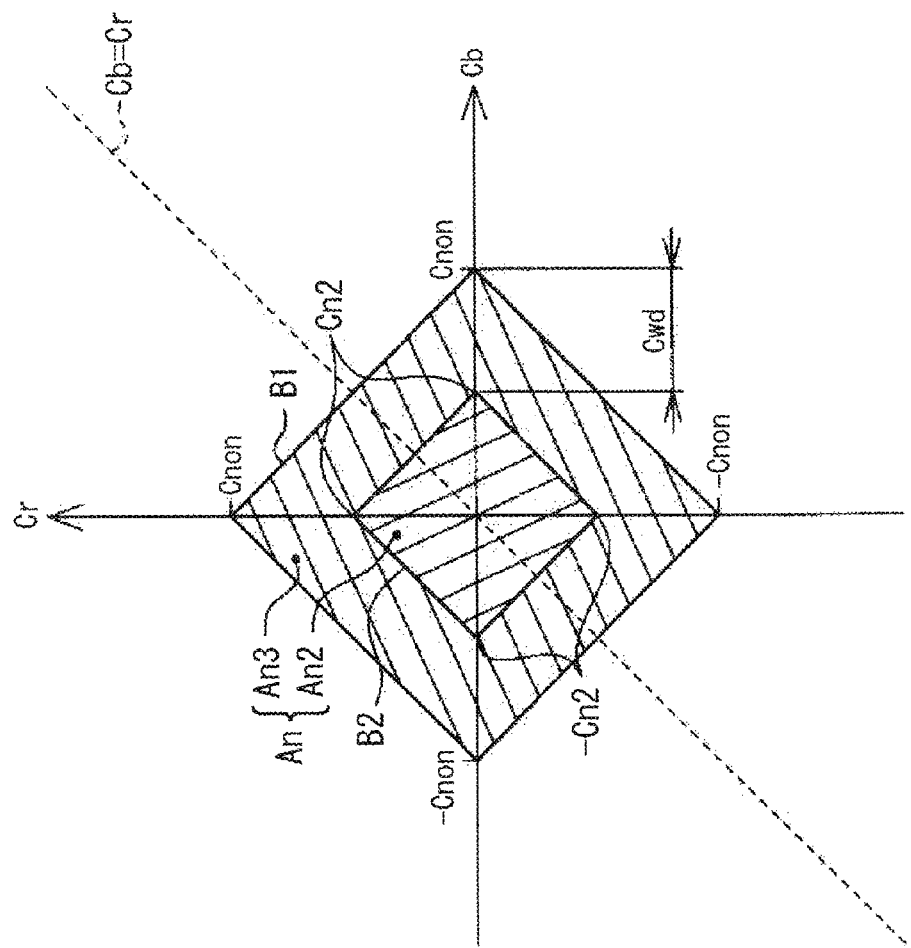
FIG. 5 illustrates a characteristic diagram showing a colorless area.

FIG. 5 shows an example of the colorless area.

The color difference signal Cr, Cb has color information representing light incident to pixels from a subject, includes various kinds of positive and negative signal levels in accordance with the color to be represented. In the color difference space (Cb–Cr space), a colorless are a boundary value Cnon as the first reference value is set as one of the image processor parameters. Lines connecting the values Cnon and −Cnon on the abscissa axis (Cb axis) and the values Cnon and −Cnon on the ordinate axis (Cr axis), that is, the lines represented by (|Cb|+|Cr|=Cnon) are set as boundary lines B1, and a colorless area surrounded by the boundary lines B1 is represented by An. The values within the colorless area are correction targets in the second and third correcting units.

Furthermore, a color difference suppression width Cwd is set as one of the image processing parameters. The value which is nearer to the center than the colorless area boundary value Cnon (−Cnon) by only the color difference suppression width Cwd is set as a second reference value Cn2 (−Cn2) in each of the axes Cb, Cr. As in the case of the colorless area boundary, lines connecting the values Cn2 and −Cn2 on the abscissa axis (Cb axis) and the values Cn2 and −Cn2 on the ordinate axis (Cr axis), that is, the lines represented by (|Cb|+|Cr|=Cn2) are set as boundary lines B2. An inner area surrounded by the boundary lines B2 is set as an area An2, and the area between each boundary line B1 and each boundary line B2 is set as an area An3. The values within the area An2 are correction targets in the second correcting unit, and the values within the area An3 are correction targets in the third correcting unit.

Figure 6:
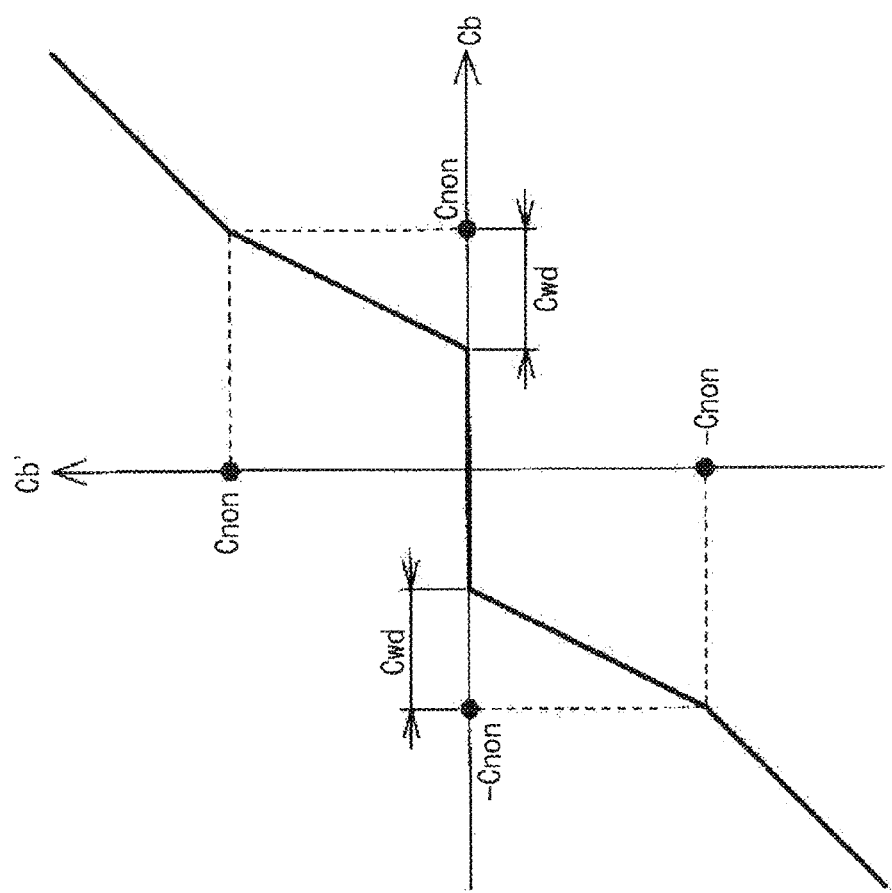
FIG. 6 illustrates a characteristic diagram showing the processing of the signal processor.

FIG. 6 is a diagram showing the relationship between the input color difference signal Cb and the output color difference signal Cb' when the color difference signal Cr is equal to "0". As the input color difference signal Cb approaches to "0", the color difference signal is corrected so as to approach to "0" more closely with a width of the color difference suppression width Cwd within the boundary of the colorless area boundary value Cnon (area An3). That is, the color difference is suppressed. The variation before and after the boundary line B1 (between the inside and the outside of the colorless area An) is made smooth, so that the color difference is prevented from being discontinuous and also the image quality is prevented from being deteriorated.

Figure 7:
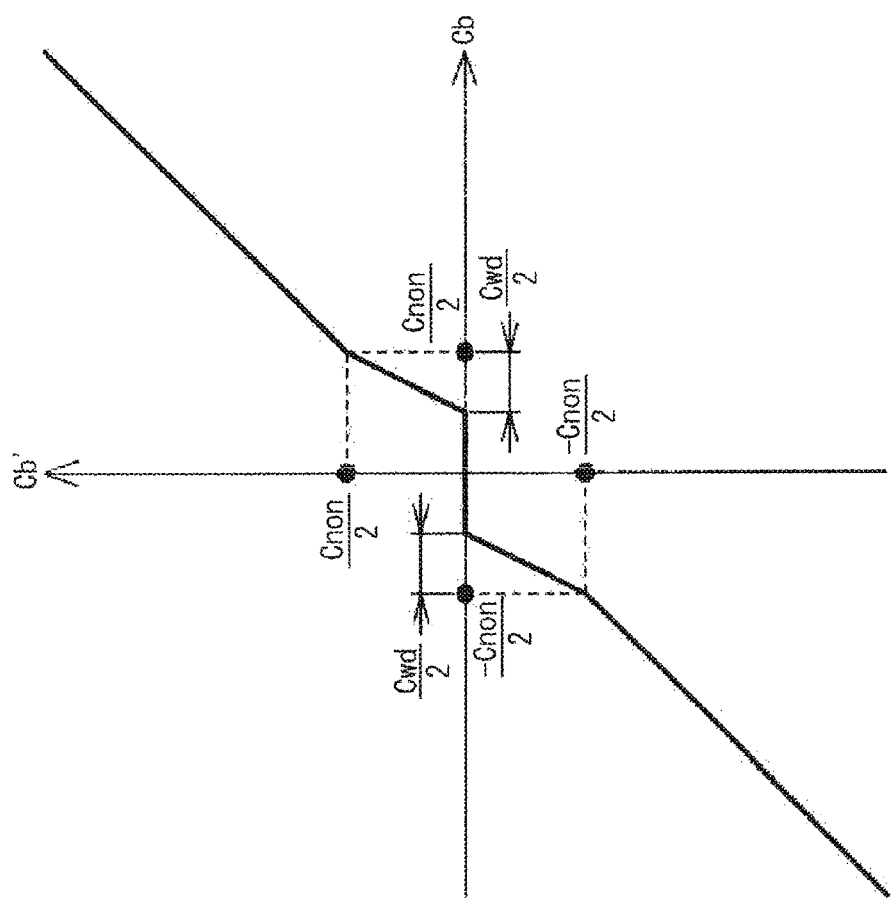
FIG. 7 is a characteristic diagram showing the processing of the signal processor.

FIG. 7 is a diagram showing the relationship between the input color difference signal Cb and the output color difference signal Cb' when the values of the color difference signal Cb and Cr are equal to each other (Cb=Cr). Under this condition, the variation between the before and after the boundary line B1 is made smooth as in the case of the input color difference signal Cr=0 shown in FIG. 6, so that the color difference is prevented from being discontinuous and the image quality is prevented from being deteriorated.

Next, an example of the construction of the correcting processor 13a will be described.

Figure 2:
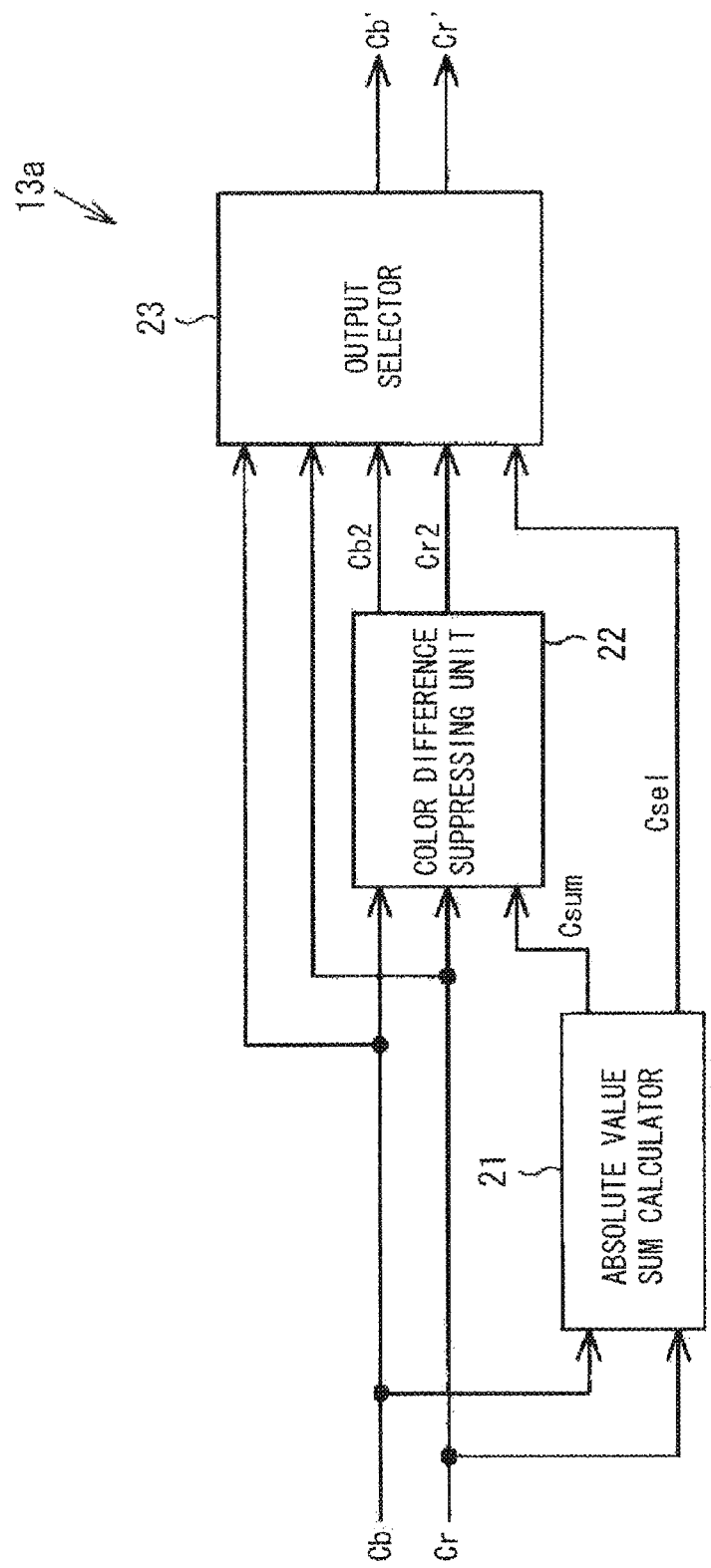
FIG. 2 illustrates a block circuit diagram of a signal processor.

As shown in FIG. 2, the correcting processor 13a has an absolute value sum calculator 21, a color difference suppressing unit 22 and an output selector 23.

The color difference signals Cb, Cr are supplied to the absolute value sum calculator 21. The absolute value sum calculator 21 sums the respective absolute values of the color difference signals Cb and Cr to obtain the absolute value sum Csum.

$$C\text{sum}=|Cb|+|Cr|$$

Subsequently, the absolute value sum calculator 21 compares the colorless area boundary value Cnon as the first reference value contained in the set image processing parameters with the above absolute value sum Csum, and generates a colorless area identification signal Csel corresponding to the comparison result. For example, the absolute value sum calculator 21 generates a colorless area identification signal Csel of H level when the colorless area boundary value Cnon is smaller than the absolute value sum Csum, and generates a colorless area identification signal Csel of L level if not so. That is, the colorless area identification signal Csel represents whether the value of the color difference signal Cb, Cr is within the colorless area An.

The color difference suppressing unit 22 receives the color difference signals Cb, Cr and the absolute value sum Csum output from the absolute value sum calculator 21, and generates suppressed color difference signals Cb2 and Cr2 on the basis of the set colorless area boundary value Cnon and the color difference suppression width Cwd. The color difference suppressing unit 22 generates the suppressed color difference signals Cb2 and Cr2 through the operation of the second and third correcting units.

The output selector 23 selects any one of the input color difference signal Cb, Cr and the suppressed color difference signal Cb2, Cr2, and output the selected signal. The colorless area identification signal Csel corresponds to the comparison result between the absolute value sum Csum of the input color difference signals Cb, Cr and the colorless area boundary value Cnon. As shown in FIG. 5, the colorless area boundary value Cnon sets the section of the colorless area An in which the values of the color difference signals Cb and Cr are near to "0". When the absolute value sum Csum is smaller than the colorless area boundary value Cnon, it indicates that the values of the color difference signals Cb and Cr are within the colorless area An. When the absolute value sum Csum is larger than the colorless area boundary value Cnon, it indicates that the values of the color difference signals Cb and Cr are out of the colorless area An. Accordingly, when the input color difference signals Cb and Cr are within the colorless area (Csel=H), the output selector 23 selects the suppressed color difference signals Cb2 and Cr2 corresponding to the output of the color difference suppressing unit 22, and outputs the selected signals as the suppressed color difference signals in the second or third correcting unit. On the other hand, when the input color difference signals Cb and Cr are not within the colorless area (Csel=L), the output selecting unit 23 selects the input color difference signals Cb and Cr, and outputs the selected signals as the suppressed color difference signals in the first correcting unit.

Figure 3:
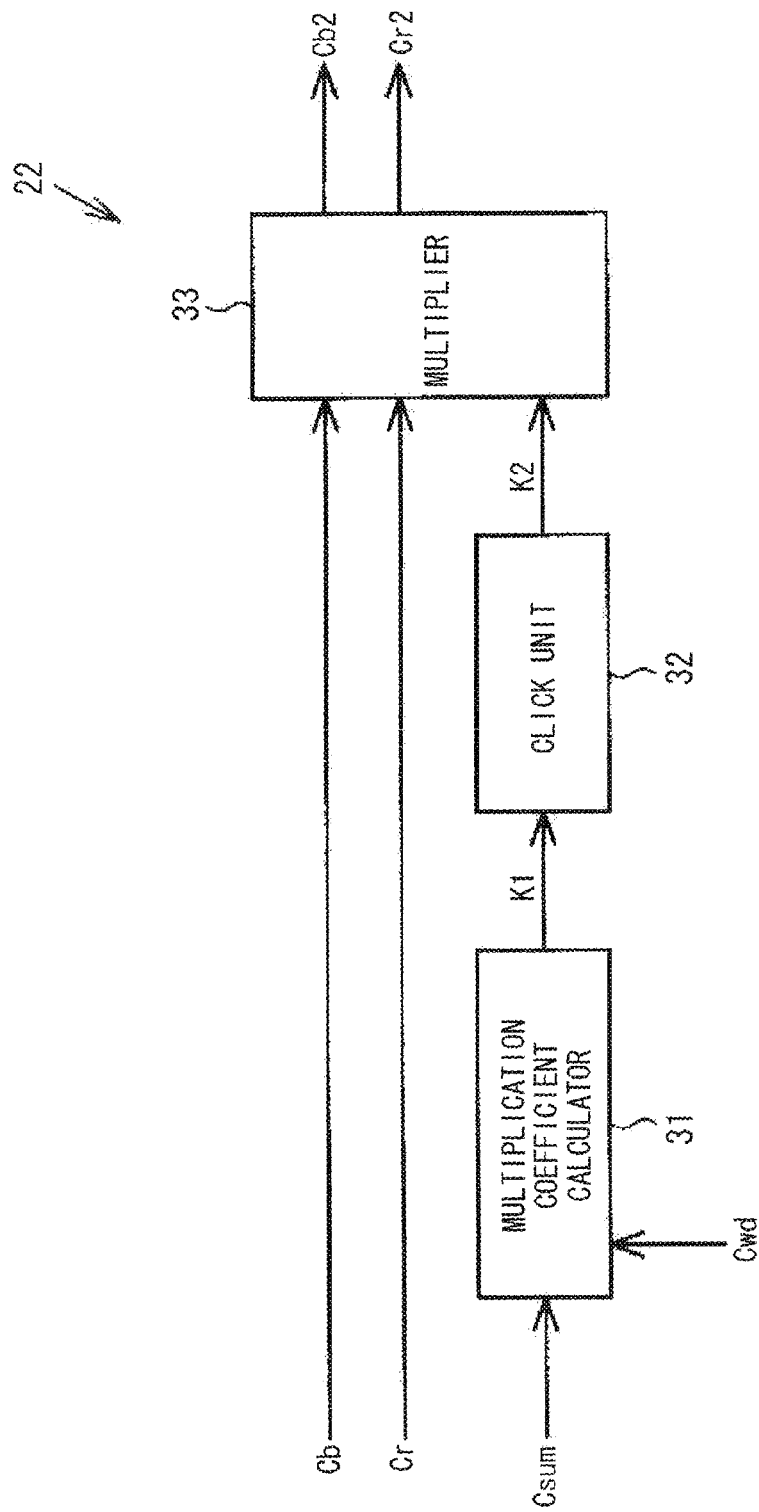
FIG. 3 illustrates a block circuit diagram of a color difference suppressing unit.

As shown in FIG. 3, the color difference suppressing unit 22 has a multiplication coefficient calculator 31, a click unit 32 and a multiplier 33.

The multiplication coefficient calculator 31 receives the absolute value sum Csum output from the absolute value sum calculator 21 and calculates a multiplication coefficient K1 by using the set colorless area boundary value Cnon and color difference suppression width Cwd according to the following equation:

$$K1=Csum-Cnon+Cwd$$

The click unit 32 receives the multiplication coefficient K1 output from the multiplication coefficient calculator 31. The click unit 32 clips the output thereof to "0" when the value of the multiplication coefficient K1 is not more than "0", clips the output thereof to the color difference suppression width Cwd when the value of the multiplication coefficient K1 is not less than the color difference suppression width Cwd, and outputs a multiplication coefficient K2 which is subjected to the click processing of outputting the multiplication coefficient K1.

By the above setting, the second reference value Cn2 is represented by Cn2=Cnon−Cwd, and thus the multiplication coefficient K1 is represented as follows:

$$K1=Csum-Cnon+(Cnon-Cn2)$$

$$K1=Csum-Cn2$$

That is, the multiplication coefficient K1 is equal to "0" or less when the absolute value sum Csum is not more than the second reference value Cn2. Accordingly, the multiplication coefficient K2 after the clip processing is equal to "0" when the absolute value sum Csum is not more than the second reference value Cn2, and it is equal to the color difference suppression width Cwd when the absolute value sum Csum is not less than the colorless area boundary value Cnon (first reference value).

The multiplier 33 performs the following calculation on the color difference signals Cb and Cr on the basis of the multiplication coefficient K2 corresponding to the output of the click unit 32 and the set color difference suppression width Cwd according to the following calculations to obtain the suppressed color difference signals Cb2 and Cr2:

$$Cb2=Cb\times K2/Cwd$$

$$Cr2=Cr\times K2/Cwd$$

If the color difference suppression width Cwd is limited to a complement, the division can be substituted by a shift operation. Accordingly, the circuit construction of the multiplier 33 can be designed to be smaller than the circuit construction for performing division.

Figure 4:
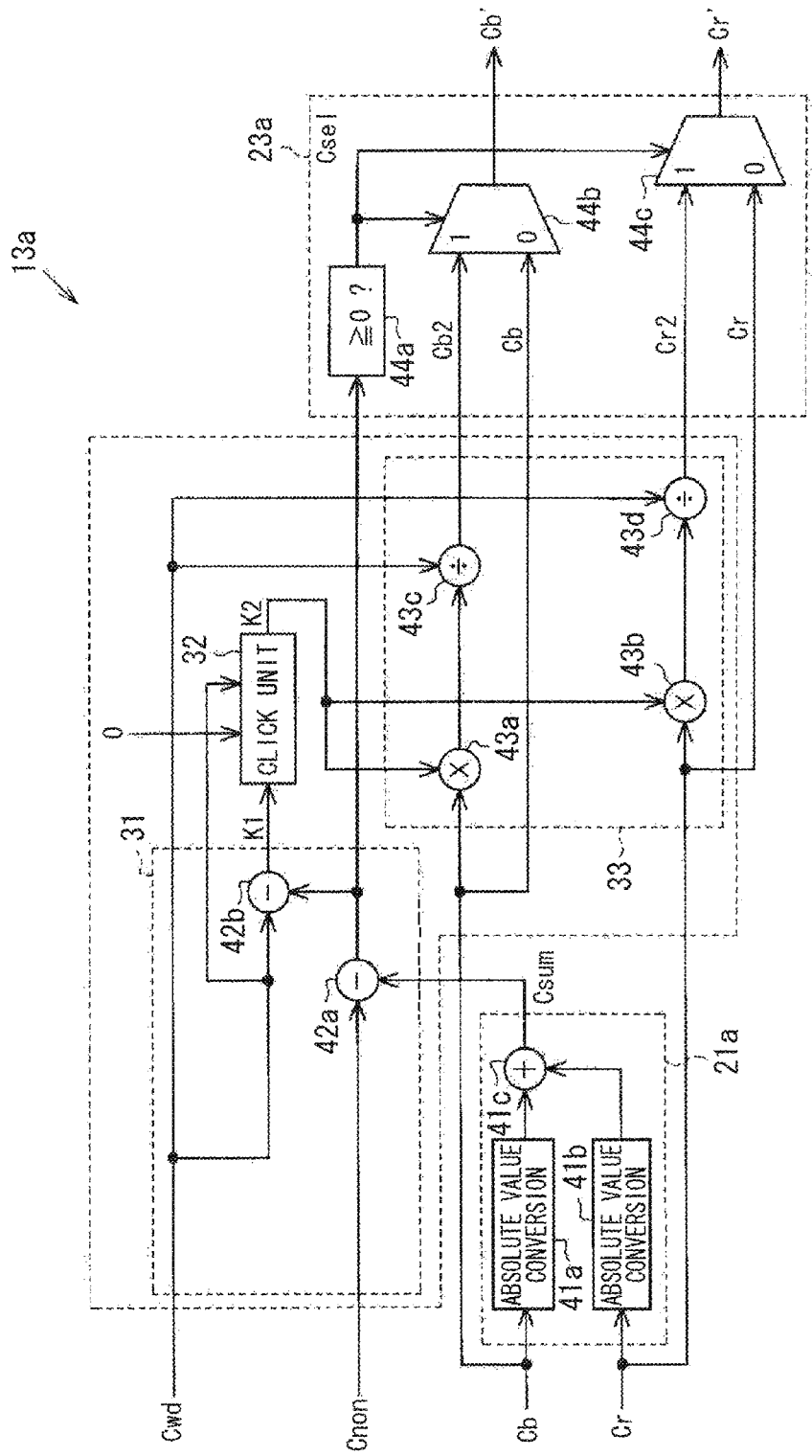
FIG. 4 is a circuit diagram of the signal processor.

Next, FIG. 4 shows an example of the detailed circuit of the correcting processor 13a.

The absolute value sum calculator 21a has absolute value conversion circuits 41a and 41b and an addition circuit 41c. The absolute value conversion circuits 41a and 41b output the signals obtained by converting the color difference signals Cb and Cr to the absolute values thereof, respectively. The addition circuit 41c adds the output signal of the absolute value conversion circuit 41a with the output signal of the absolute value conversion circuit 41b to generate the absolute value sum Csum, and outputs the generated absolute value sum Csum.

The multiplication coefficient calculator 31 of the color difference suppressing unit 22 has two subtraction circuits 42a and 42b. The absolute value sum Csum output from the absolute value sum calculator 21a and the colorless area boundary value Cnon are input to the subtraction circuit 42a. The subtraction circuit 42a outputs the subtraction result obtained by subtracting the absolute value sum Csum from the colorless area boundary value Cnon. The color difference suppression width Cwd and the output signal of the subtraction circuit 42a are input to the subtraction circuit 42b. The subtraction circuit 42b outputs as the multiplication coefficient K1 the subtraction result obtained by subtracting the output signal of the subtraction circuit 42a from the color difference suppression width Cwd.

The multiplication coefficient K1 generated in the multiplication coefficient calculator 31, the color difference suppression width Cwd and "0" to be clipped are input to the clip unit 32. The clip unit 32 outputs the multiplication coefficient K2 by clipping the multiplication coefficient K1 by the color difference suppression width Cwd and "0".

The multiplier 33 has two multiplication circuits 43a and 43b and two dividing circuits 43c and 43d. The color difference signal Cb and the multiplication coefficient K2 are input to the multiplication circuit 43a, and the multiplication circuit 43a outputs the multiplication result of the color difference signal Cb and the multiplication coefficient K2. Likewise, the multiplication circuit 43a outputs the multiplication result of the color difference signal Cr and the multiplication coefficient K2. The output signal of the multiplication circuit 43a and the color difference suppression width Cwd are input to the dividing circuit 43c. The dividing circuit 43c outputs as the suppressed color difference signal Cb2 the result obtained by dividing the output signal of the multiplication circuit 43a by the color difference suppression width Cwd. Likewise, the dividing circuit 43c outputs as the suppressed color difference signal Cr2 the result obtained by dividing the output signal of the multiplication circuit 43a by the color difference suppression width Cwd.

The output selector 23a has a determining circuit 44a and two selecting circuits 44b and 44c. The determining circuit 44a receives a signal output from the subtraction circuit 42a of the multiplication coefficient calculator 31. The output signal of the subtraction circuit 42a is a result obtained by subtracting the absolute value sum Csum from the colorless area boundary value Cnon. The determining circuit 44a determines whether the subtraction result of the subtraction circuit 42a is equal to "0" or more, and outputs a colorless area identification signal Csel in accordance with the determination result. For example, the determining circuit 44a outputs the colorless area identification signal Csel of L level when the subtraction result of the subtraction circuit 42a is equal to "0" or more, and outputs the colorless area identification signal Csel of H level when the subtraction result of the subtraction circuit 42a is less than "0". Accordingly, the absolute value sum calculator 21 shown in FIG. 2 comprises the absolute value sum calculator 21a shown in FIG. 4, the subtraction circuit 42a of the multiplication coefficient calculator 31 and the determining circuit 44a of the output selector 23a.

The colorless area identification signal Csel output from the determining circuit 44a is supplied to the two selecting circuits 44b and 44c. The input color difference signal Cb and the suppressed color difference signal Cb2 are input to the selecting circuit 44b, and the input color difference signal Cr and the suppressed color difference signal Cr2 are input to the selecting circuit 44c. The selecting circuit 44b selects the input color difference signal Cb or the suppressed color difference signal Cb2 in accordance with the colorless area identification signal Csel, and outputs the selected signal as the output color difference signal Cb'. Likewise, the selecting circuit 44c selects the input color difference signal Cr or the suppressed color difference signal Cr2 in accordance with the colorless area identification signal Csel, and outputs the selected signal as the output color difference signal Cr'. For example, when the colorless area identification signal Csel has L level, the selecting circuits 44b, 44c selects the input color difference signals Cb and Cr, and outputs the output color difference signals Cb' and Cr' which are equal to the input color difference signals Cb and Cr. Furthermore, when the colorless area identification signal Csel has H level, the selecting circuits 44b, 44c selects the suppressed color difference signals Cb2 and Cr2, and outputs the output color difference signals Cb' and Cr' which are equal to the suppressed color difference signals Cb2 and Cr2.

When the complement of the color difference suppression width Cwd is limited to two's complement, shift operation circuits are used in place of the dividing circuits 43c and 43d. Accordingly, the circuit construction of the multiplier 33 can be miniaturized as compared with the circuit construction executing the dividing operation.

It is preferable that the colorless area boundary value Cnon contained in the image processing parameters is set to a value in the range of 5% to 15% of the maximum value of the color difference signal Cb, Cr. The color difference signals Cb, Cr are digital values, and for example when they are set in the range from −128 to 127, the colorless area boundary value Cnon is set to 8 or 16.

Figure 8:
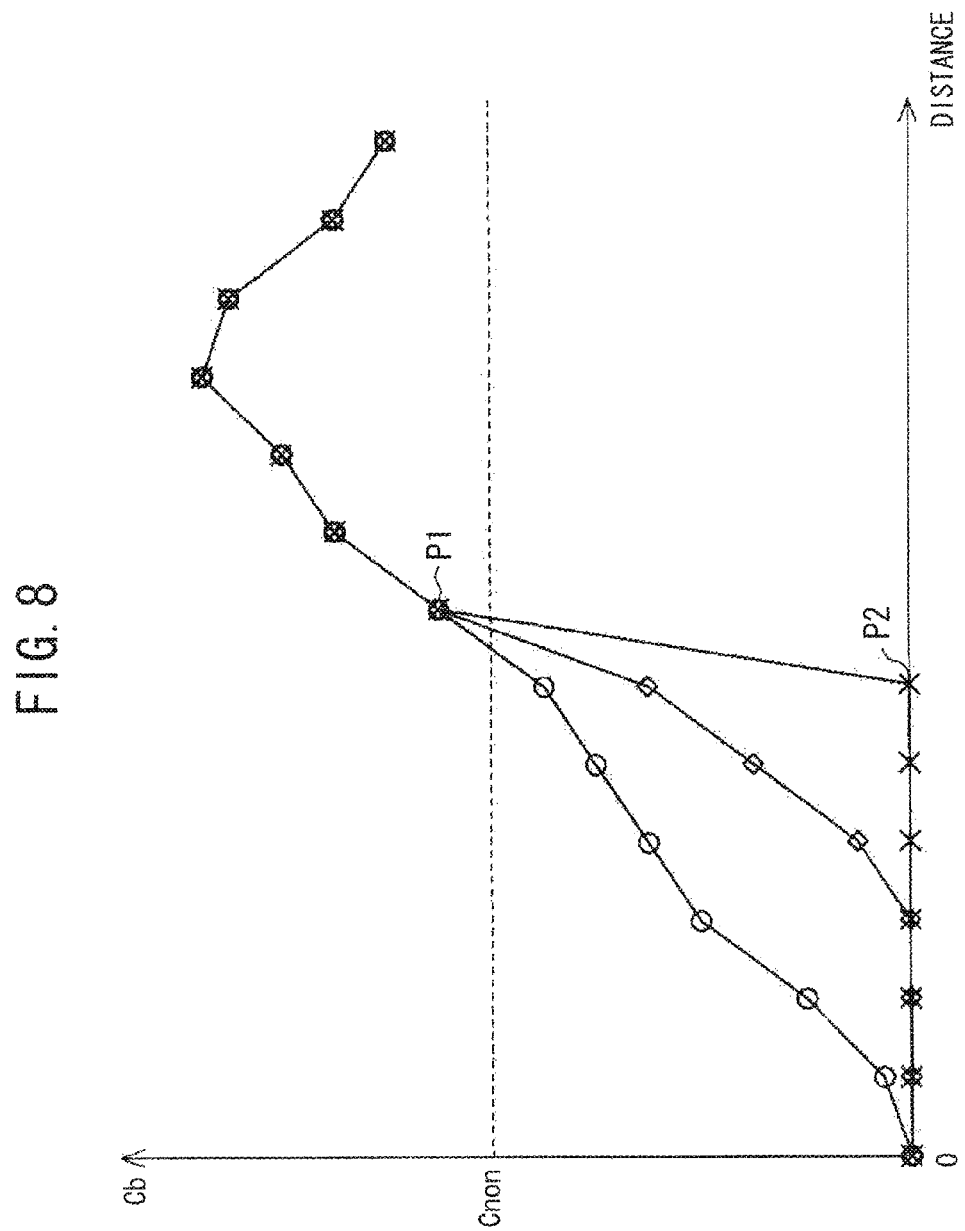
FIG. 8 illustrates a diagram showing a distance-signal value characteristic.

Furthermore, it is preferable that the color difference suppression width Cwd contained in the image processing parameters is set in the range from ¼ to ½ of the colorless area boundary value Cnon. This preferable range will be described with reference to FIG. 8. In FIG. 8, the abscissa axis represents the distance from the center point of the color difference space, and the ordinate axis represents the value of the color difference signal Cb. The value of the input color difference signal Cb is represented by a point O, the value of the output color difference signal Cb' when the color difference suppression width Cwd is set to the half of the colorless area boundary value Cnon is represented by a point "◇", and the value of the output color difference signal Cb when the color difference suppression width Cwd is set to ⅛ of the colorless area boundary value Cnon is represented by a point X.

When the color difference suppression width Cwd is smaller than the colorless area boundary value Cnon (the points set in the case of ⅛ in FIG. 8), with respect to the corrected output color difference signals Cb', Cr', the difference between the value at the point P1 in the non-colorless area (the area at the upper side of the colorless area boundary value Cno) and the value at the point P2 is large, that is, the color difference varies rapidly, and thus the variation of color is remarkable (the colored state rapidly varies to the colorless state), so that the color-difference corrected portion is conspicuous. On the other hand, when the color difference suppression width Cwd is set to a value near to the colorless area boundary value Cnon, the value of the output color difference signal Cb' is nearer to the input color difference signal Cb as compared with the points set when the color difference suppression width Cwd is set to the half of the colorless area boundary value Cnon in FIG. 8. As a result, the output color difference signal Cb' whose value is equal to "0" is reduced, or the value of the output color difference signal Cb' is farther from "0", so that the effect of suppressing the color shift noise is reduced. That is, the color shift noise is conspicuous. Accordingly, as described above, by setting the color difference suppression width Cwd in the range from ¼ to ½ of the colorless area boundary value Cnon, the rapid variation of color can be suppressed, and the color shift noise can be reduced.

As described above, according to aspects of this embodiment, the following effects can be obtained.

(1) With respect to the correcting processor 13a, a colorless area An containing the original point of a color difference space in which two input color difference signals are set as two intersecting axes, a first boundary line B1 through which the inside and outside of the colorless area An are partitioned, a suppressing area An3 which is nearer to the original point than the first boundary line B1 and defined by the color difference suppression width Cwd, and a second boundary line B2 through which the inside of the suppression area An3 and the area An2 inside the suppression area are partitioned are set in the color difference space. When the values of the color difference signals Cb and Cr are at the outside of the colorless area An, the correcting processor 13a sets the correction amount for the input color difference signals Cb, Cr to "0" and generates the output color difference signals Cb', Cr'. Furthermore, when the values of the color difference signals Cb, Cr are at the inside of the suppression area An3, the input color difference signals Cb, Cr are corrected to be nearer to "0" to generate the output color difference signals Cb', Cr'. Furthermore, when the values of the color difference signals Cb, Cr are within the suppression area An3, the correcting processor 13a corrects the input color difference signals Cb, Cr so that the values of the input color difference signals Cb, Cr are between a value on the first boundary line B1 and a value on the second boundary line B2, thereby generating the output color difference signals Cb', Cr'.

Accordingly, with respect to the input color difference signals Cb, Cr out of the colorless area An, the output color difference signals Cb', Cr' whose correction amount is equal to "0" are output. That is, the output color difference signals whose values are equal to the input color difference signals Cb, Cr are generated, and thus occurrence of new color shift can be suppressed. Furthermore, the input color difference signals Cb, Cr at the inside of the suppression area An3 are made to approach to "0", and the output color difference signals Cb', Cr' are generated, so that the color shift noise can be reduced. Still furthermore, the input color difference signals Cb, Cr within the suppression area An3 are corrected to be located between the value on the first boundary line B1 and the value on the second boundary line B2, and the output color difference signals Cb' and Cr' are generated. Therefore, the values of the output color difference signals Cb', Cr' can be prevented from rapidly varying, that is, the rapid variation of color can be suppressed.

(2) The absolute value sum calculator 21 calculates the absolute value sum Csum of the two input color difference signals Cb and Cr. The absolute value sum calculator 21 as the signal generator compares the absolute value sum Csum with the first reference value Cnon, and generates the colorless area identification signal Csel corresponding to the comparison result. When the absolute value sum Csum is smaller than the second reference value Cn2 smaller than the first reference value Cnon, the color difference suppressing unit 22 corrects the input color difference signals Cb and Cr so that the input color difference signals Cb, Cr are made to approach to "0", thereby generating the suppressed color difference signals Cb2 and Cr2. Furthermore, when the absolute value sum Csum is located between the first reference value Cnon and the second reference value Cn, the color difference suppressing unit 22 corrects the input color difference signals Cb and Cr so that the input color difference signal Cb, Cr is located between the output value when the absolute value sum Csum is equal to the first reference value Cnon and the output value when the absolute value sum is equal to the second reference value, thereby generating the suppressed color difference signals Cb2 and Cr2. The output selector 23 receives the input color difference signals Cb, Cr, the suppressed color difference signals Cb2, Cr2 and the colorless area identification signal Csel. When the absolute value sum Csum is above the first reference value Cnon on the basis of the colorless area identification signal Csel, the output selector 23 selects the input color difference signals Cb and Cr, and outputs the selected signals as the output color difference signals Cb', Cr'. Furthermore, when the absolute value sum Csum is smaller than the first reference value Cnon, the output selector 23 selects the suppressed color difference signals Cb2, Cr2, and outputs the selected signals as the output color difference signals Cb', Cr'.

Accordingly, the correcting processor 13a has the calculator 21 for calculating the absolute value sum Csum of the input color difference signals Cb, Cr. By calculating the absolute value sum Csum, the values of the input color difference signals Cb, Cr can be easily compared with the first reference value Cnon and the second reference value Cn2 which define the colorless area An, and the increase of the calculation load can be suppressed. Furthermore, when the absolute value sum Csum is smaller than the second reference value Cn2, with respect to the suppressed color difference signals Cb2, Cr2 generated by the color difference suppressing unit 22, the correction is made so that the input color difference signals Cb, Cr are made to approach to "0", and thus the color shift noise can be reduced. Furthermore, with respect to the suppressed color difference signals Cb2, Cr2 generated by the color suppressing unit 22, when the absolute value sum Csum is located between the first reference value Cnon and the second reference value Cn2, the input color difference signals Cb and Cr are corrected to be located between the output value when the absolute value sum Csum is equal to the first reference value Cnon and the output value when the absolute value sum Csum is equal to the second reference value Cn2, and thus the values of the output color difference signals Cb' and Cr' can be prevented from varying rapidly, that is, the rapid variation of color can be suppressed. Furthermore, the output selector 23 outputs the input color difference signals Cb, Cr selected according to the colorless area identification signal Csel as the output color difference signals Cb', Cr', that is, the output color difference signals Cb', Cr' whose values are equal to the input color difference signals Cb, Cr are output, so that occurrence of new color shift can be suppressed.

(3) The multiplication coefficient calculator 31 calculates the multiplication coefficient K1 based on the absolute value sum Csum. Accordingly, this multiplication coefficient K1 can be used for both the two input color difference signals Cb and Cr. Therefore, it is unnecessary to calculate the respective multiplication coefficients for the respective signals Cb and Cr, so that the calculation load is small and the multiplication coefficient K1 can be calculated quickly.

Each of the above embodiments may be implemented in the following style.

In the above embodiments, the imaging sensor 11 in which the color filters are arranged in the Bayer pattern is used as an imaging element, however, an imaging sensor having another arrangement may be used. The arrangement direction of the pixels is not limited to the orthogonal two axes. An imaging sensor in which the pixels of the respective colors are formed in the depth direction may be used.

In the above embodiments, the correcting processor 13a corrects each of the values of the color difference signals Cb and Cr to a value on a line connecting the output value corresponding to the first reference value and the output value (=0) corresponding to the second reference value, however, these values may be corrected to values on any curved line, such as a quadratic curve, a cubic curve or the like.

In the above embodiments, the boundary for compartmenting the colorless area An is defined by lines connecting the values Cnon and −Cnon on the Cb axis and the values Cnon and −Cnon on the Cr axis, and the colorless area An is set as a rhombus. However, the shape of the colorless area An may be set to any polygonal or circular shape.

In the above embodiments, the correcting processor 13a is constructed to correct the color difference signals Cb and Cr. That is, the signal processor 13 may be constructed so as to convert imaging data to an YCbCr signal and convert the YCbCr signal to a signal such as a VUV signal, a CIELAB signal or the like, thereby correcting a signal having color information.

The second multiplication coefficient K2 calculated by the clip unit 32 is clipped by the color difference suppression width Cwd. The clipped area corresponds to the outside of the colorless area An. In the calculation of the multiplier 33, the result obtained by dividing the multiplication coefficient K2 by the color difference suppression width Cwd is equal to "1" in the area clipped by the color difference suppression width Cwd. Accordingly, the suppressed color difference signals Cb2 and Cr2 calculated in this area are equal to the values of the input color difference signals Cb and Cr. Therefore, the circuit corresponding to the portion for calculating the colorless area identification signal Csel in the output selector 23 and the absolute value sum calculator 21 in FIG. 2 may be omitted.

The embodiments of the image signal processing device and the image signal processing method described above enable the occurrence of the color shift to be suppressed and the color shift noise to be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although aspects of the embodiments of the present inventions have been described in detail, it should be understood that the various changes, substitutions, and alterations could be made hereto without departing from the spirit and scope of the invention.

What is claimed is:

1. An image signal processing device for correcting at least two color difference signals comprising:
 a first correcting unit configured to set a correction amount for input color difference signals to "0" and generating output color difference signals when a colorless area containing the original point of a color difference space in which the two color difference signals are set as two intersecting axes, a first boundary line through which the inside and outside of the colorless area are partitioned, a suppression area which is nearer to the original point than the first boundary line and defined by a color difference suppression width, and a second boundary line through which the interior of suppression area and the inside area of the suppression area are partitioned are set in the color difference space and the values of the color difference signals are outside of the colorless area;

a second correcting unit configured to correct the input color difference signals so that the values of the input color difference signals approach to "0," when the values of the color difference signals are inside of the suppression area, thereby generate the output color difference signals; and a third correcting unit configured to correct the input color difference signals so that the value of each of the input color difference signals is located between a value on the first boundary line and a value on the second boundary line when the values of the color difference signals are within the colorless area and outside the suppression area, and configured to generate the output color difference signals.

2. The image signal processing device according to claim 1, wherein
the second correcting unit corrects the input color difference signals to "0" when the values of the color difference signals are inside of the suppression area, thereby generating the output color difference signals.

3. The image signal processing device according to claim 2, wherein
the first boundary line is set to a line on which the absolute value sum of values on both of the axes is equal to a first reference value, the second boundary line is set to a line on which the absolute value sum of values on both the axes is equal to a second reference value, and the first correcting unit compares the absolute value sum of the input color difference signals with the first reference value to determine whether the input color difference signals are outside of the colorless area.

4. The image signal processing device according to claim 1, wherein
the third correcting unit corrects the values of the input color difference signals to values obtained when values between first and second intersection-point values of a line passing through a point on the color difference space represented by the input color difference signals and the original point of the color difference space and the first and second boundary lines are interpolated in accordance with the input color difference signals.

5. An image signal processing device for executing the processing of suppressing color shift noise of input color difference signals, comprising:
an absolute value sum calculator configured to calculate the absolute value sum of two input color difference signals;
a signal generator configured to compare the absolute value sum with a first reference value and generating a colorless area identification signal corresponding to the comparison result;
a color difference suppressing unit configured to correct the input color difference signals so that the input color difference signals are made to approach to "0" a, when the absolute value sum is smaller than a second reference value that is smaller than the first reference value, configured to correct the input color difference signals so that the input color difference signals are set to values between an output value when the absolute value sum is equal to the first reference value and an output value when the absolute value sum is equal to the second reference value, when the absolute value sum is between the first reference value and the second reference value, and configured to generate suppressed color difference signals; and
an output selector configured to receive the input color difference signals, the suppressed color difference signals and the colorless area identification signal, configured to select the input color difference signals and outputting the selected signals as output color difference signals, when the absolute value sum is above the first reference value on the basis of the colorless area identification signal, and configured to select the suppressed color difference signals and outputting the selected signals as output color difference signals, when the absolute value sum is smaller than the first reference value.

6. An image signal processing device for executing processing of suppressing color shift noise of input color difference signals, comprising:
an absolute value sum calculator configured to calculate an absolute value sum of two input color difference signals; and
a color difference suppressing unit configured to generate suppressed color difference signals equal to the input color difference signals, when the absolute value sum is above a first reference value, configured to correct the input color difference signals so that the input color different signals are made to approach to "0," when the absolute value sum is smaller than a second reference value smaller than the first reference value, thereby generating suppressed color difference signals, and configured to correcting the input color difference signals so that the input color difference signals are equal to values between an output value, when the absolute value sum is equal to the first reference value, and an output value, when the absolute value sum is equal to the second reference value, when the absolute value sum is located between the first reference value and the second reference value, thereby generating the suppressed color difference signals.

7. The image signal processing device according to claim 6, wherein
the color difference suppressing unit comprises:
a multiplication coefficient calculator configured to calculate a first multiplication coefficient K1 on the basis of the absolute value sum Csum, the first reference value Cnon and a color difference suppression width Cwd according to the following equation:

$$K1 = C\text{sum} - C\text{non} + Cwd;$$

a clip unit configured to calculate a second multiplication coefficient obtained by subjecting the first multiplication coefficient K1 to clip processing using "0" and the color difference suppression width Cwd; and
a multiplier configured to calculate suppressed color difference signals Cb2 and Cr2 on the basis of the input color difference signals Cb and Cr, the second multiplication coefficient and the color difference suppression width Cwd according to the following equation:

$$Cb2 = Cb \times K2/Cwd$$

$$Cr2 = Cr \times K2/Cwd.$$

8. An image signal processing method performed by an image signal processing device for suppressing color shift noise of color difference signals, wherein the method comprises:
setting a first correction amount for input color difference signals to "0" and generating output color difference signals when a colorless area containing the original point of a color difference space in which the two color difference signals are set as two intersecting axes, a first boundary line through which the inside and outside of the colorless area are partitioned, a suppression area which is nearer to the original point than the first boundary line and defined by a color difference suppression width, and a second boundary line through which the interior of suppression area and the inside area of the suppression area are partitioned are set in the color difference space and the values of the color difference signals are outside of the colorless area;

setting a second correction amount for the input color difference signals so that the values of the input color difference signals approach to "0" when the values of the color difference signals are inside of the suppression area; the input color difference signals so that the value of each of the input color difference signals is located between a value on the first boundary line and a value on the second boundary line when the values of the color difference signals are within the colorless area and outside the suppression area; and generating output color difference signals.

9. The image signal processing method according to claim 8, wherein the second correction amount corrects the input color difference signals to "0" when the values of the color difference signals are inside of the suppression area, thereby generating the output color difference signals.

10. The image signal processing method according to claim 8, further comprising a third correction amount that corrects the values of the input color difference signals to values obtained when values between first and second intersection-point values of a line passing through a point on the color difference space represented by the input color difference signals and the original point of the color difference space and the first and second boundary lines are interpolated in accordance with the input color difference signals.

11. The image signal processing method according to claim 8, wherein the first boundary line is set to a line on which the absolute value sum of values on both the axes is equal to a first reference value, the second boundary line is set to a line on which the absolute value sum of values on both the axes is equal to a second reference value, and setting the first correction amount includes comparing the absolute value sum of the input color difference signals with the first reference value to determine whether the input color difference signals are outside of the colorless area.

12. An image signal processing method performed by an image signal processing device for suppressing color shift noise of input color difference signals, wherein the method comprises:

calculating an absolute value sum of two input color difference signals;

comparing the absolute value sum with a first reference value and generating a colorless area identification signal corresponding to the comparison result;

suppressing a color difference, including:
correcting the input color difference signals so that the input color difference signals are made to approach to "0," when the absolute value sum is smaller than a second reference value that is smaller than the first reference value, and
correcting the input color difference signals so that the input color difference signals are set to values between an output value when the absolute value sum is equal to the first reference value and an output value when the absolute value sum is equal to the second reference value, when the absolute value sum is between the first reference value and the second reference value; and generating suppressed color difference signals; and
selecting an output, including:

receiving the input color difference signals, the suppressed color difference signals and the colorless area identification signal;

selecting the input color difference signals and outputting the selected signals as output color difference signals, when the absolute value sum is above the first reference value on the basis of the colorless area identification signal; and selecting the suppressed color difference signals and outputting the selected signals as output color difference signals, when the absolute value sum is smaller than the first reference value.

13. The image signal processing method according to claim 12, wherein the color difference suppressing processing comprises:

calculating a first multiplication coefficient K1 on the basis of the absolute value sum Csum, the first reference value Cnon and a color difference suppression width Cwd according to the following equation:

$$K1 = C\text{sum} - C\text{non} + Cwd;$$

calculating a second multiplication coefficient K2 obtained by subjecting the first multiplication coefficient K1 to clip processing using "0" and the color difference suppression width Cwd; and calculating suppressed color difference signals Cb2 and Cr2 on the basis of the input color difference signals Cb and Cr, the second multiplication coefficient and the color difference suppression width Cwd according to the following equation:

$$Cb2 = Cb \times K2/Cwd$$

$$Cr2 = Cr \times K2/Cwd.$$

14. An image signal processing method performed by an image signal processing device for suppressing color shift noise of input color difference signals, wherein the method comprises:

calculating an absolute value sum of two input color difference signals; and suppressing a color difference, including:

generating suppressed color difference signals equal to the input color difference signals when the absolute value sum is above a first reference value;

correcting the input color difference signals so that the input color different signals are made to approach to "0" when the absolute value sum is smaller than a second reference value that is smaller than the first reference value, thereby generating suppressed color difference signals, and correcting the input color difference signals so that the input color difference signals are equal to values between an output value when the absolute value sum is equal to the first reference value and an output value when the absolute value sum is equal to the second reference value in a case where the absolute value sum is located between the first reference value and the second reference value, thereby generating the suppressed color difference signals.

15. An imaging device comprising:

an imaging element that has plural pixels formed therein and generates imaging data corresponding to an input light amount of each pixel;

a signal converter for converting the imaging data to a brightness signal and color difference signals;

a signal corrector comprising an image signal processing device that is equipped with:

a first correcting unit for setting a correction amount for input color difference signals to "0" and generating output color difference signals when a colorless area containing the original point of a color difference space in which the two color difference signals are set as two intersecting axes, a first boundary line through which the inside and outside of the colorless area are partitioned, a suppression area which is nearer to the original point than the first boundary line and defined by a color difference suppression width, and a second boundary line through which the interior of suppression area and the inside area of the suppression area are partitioned are set in the color difference space and the values of the color difference signals are at the outside of the colorless area, a second correcting unit for correcting the input color difference signals so that the values of the input color difference signals approach to "0" when the values of the color difference signals are at the inside of the suppression area, thereby generating the output color difference signals, and a third correcting unit for correcting the input color difference signals so that the value of each of the input color difference signals is located between a value on the first boundary line and a value on the second boundary line when the values of the color difference signals are within the suppression area, thereby generating the output color difference signals; and a code converter for converting the color difference signals and the brightness signal corrected by the signal corrector to a predetermined compression code.

* * * * *